Figure 1:
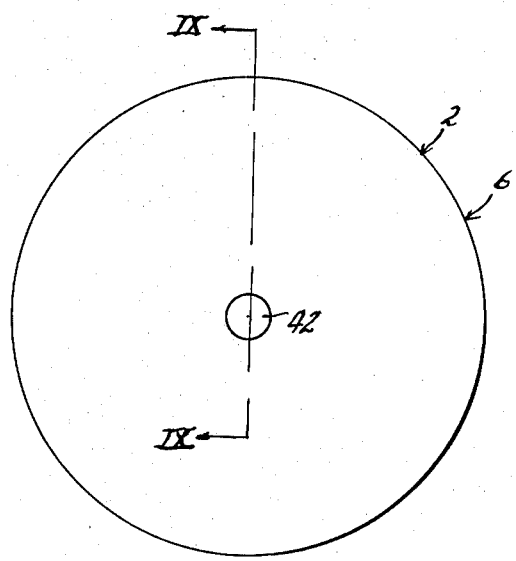

United States Patent [19]

Olson

[11] 4,230,380

[45] Oct. 28, 1980

[54] PHONOGRAPH RECORD HOLDER

[76] Inventor: Richard C. Olson, 913 Fair Oaks Ct., Liberty, Mo. 64068

[21] Appl. No.: 33,042

[22] Filed: Apr. 25, 1979

[51] Int. Cl.³ .............................................. B65D 85/57
[52] U.S. Cl. ......................................... 312/9; 206/1.5;
        206/310; 206/444; 312/10
[58] Field of Search ............... 206/403, 404, 405, 406,
        206/303, 309, 310, 311, 1.5, 444; 211/40;
        220/300, 93; 312/8, 9, 10

[56] References Cited

U.S. PATENT DOCUMENTS

| | | | |
|---|---|---|---|
| 1,320,958 | 11/1919 | Albrecht et al. | 206/310 X |
| 2,670,261 | 2/1954 | Mueller | 206/310 |
| 3,007,702 | 11/1961 | Eby | 206/309 X |
| 3,139,212 | 6/1964 | Stallard | 220/93 |
| 3,828,899 | 8/1974 | Scott | 206/1.5 X |
| 3,892,309 | 7/1975 | Coffey et al. | 220/93 X |

FOREIGN PATENT DOCUMENTS 279043 6/1928 United Kingdom ..................... 206/403

Primary Examiner—Allan N. Shoap
Attorney, Agent, or Firm—John A. Hamilton

[57] ABSTRACT

A phonograph record holder comprising a substantially dust-proof flat, circular case including separable sections each adapted to carry a group of stacked records, locking means operable to secure the records in each case section when that section is removed from the other with its own side down, to facilitate handling of the record stacks when placing them on or removing them from the spindles of automatic record changers, and spring presser members operable to maintain the stacks under compressive pressure to inhibit warpage of the records.

7 Claims, 10 Drawing Figures

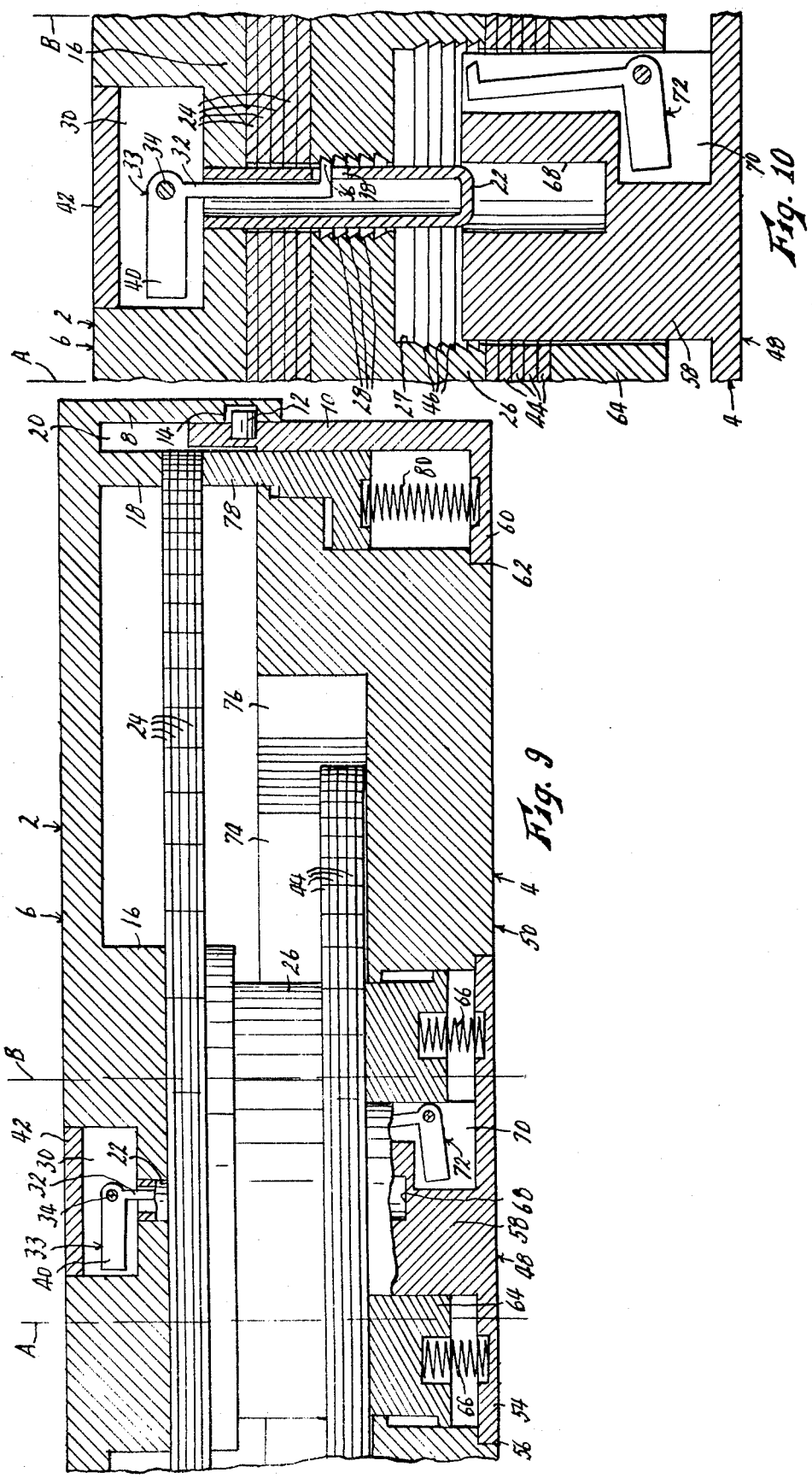

PHONOGRAPH RECORD HOLDER

This invention relates to new and useful improvements in record holders, and has as its overall object the provision of a holder which prevents or greatly reduces much of the damage to which phonograph records are subject during storage and handling thereof, including the stacking and unstacking of records onto and off of the spindles of the automatic record changers of phonographs.

One common cause of such damage is dust, which of course tends to collect on records not stored in closed albums or the like, or left on the phonograph, and which if not carefully removed before next playing each record, damages the record as particles thereof come between the surface of the tone groove and the stylus of the tone arm. Another cause of such damage is careless handling. If the fingers touch the grooved surface of the record, they deposit skin oil thereon, which may in itself be injurious to the material of which the record is formed, and which tends to attract and retain more dust. Another type of damage resulting from careless handling is scratching of the record, which occurs when one record, or any other hard object, is dragged across the groove surface of another. Still another cause of damage is warpage of the record, which occurs when records are stored loosely in improper positions, such as flat instead of on edge, or stored in zones of excessive temperature, or are of substandard manufacture, or from other causes. It is to the elimination or substantial reduction of record damage of these types that the present invention is directed.

More specifically, an object of the present invention is the provision of a record holder which constitutes a case which may be closed to a substantially dust-proof tightness.

Another object is the provision of a record holder which greatly facilitates safe manual handling of the records themselves when removing them from the holder to place them on the phonograph spindle, or when replacing them in the holder, to the end that they may be handled easily without touching and depositing skin oil on the grooved surfaces thereof, and without moving the records of a stack of records relative to each other to cause scratching. In this connection the holder comprises a circular case having a pair of open-sided sections adapted to be secured together with their open sides confronting each other, each section being adapted to contain a stack of records, each of a selected size and no greater in number than is recommended to be placed on a record changer spindle at one time. The case section elements keep the stacks accurately centered, and the entire stack may be grasped at the extreme edges of the stack, to remove and handle the stack as a unit, without relative movement between the individual records, and without touching the grooved surfaces thereof. Entire "programs" of recorded music, requiring as many as five or six long-playing records, may thus be pre-arranged and permanently stored.

A further object is the provision of a record holder of the character described including means operable to lock the records in each of the sections of the case as long as that section is inverted, with its open side down, so that the records cannot fall therefrom. Thus, if either section is disposed above the other, it can be detached and removed from the other with no spillage of records, and must be inverted to an upright position before its records can be removed.

Still another object is the provision of a record holder of the character described including spring-actuated means for maintaining the stacks of records in the holder under a flattening compressive load, whereby to inhibit warpage thereof when stored over long periods of time. Moreover, this compressive load is applied only to non-grooved areas of the records, in order to avoid pressing the grooved areas together, which could cause damage thereto.

Other objects are simplicity and economy of structure, and efficiency and dependability of operation.

Figure 2:
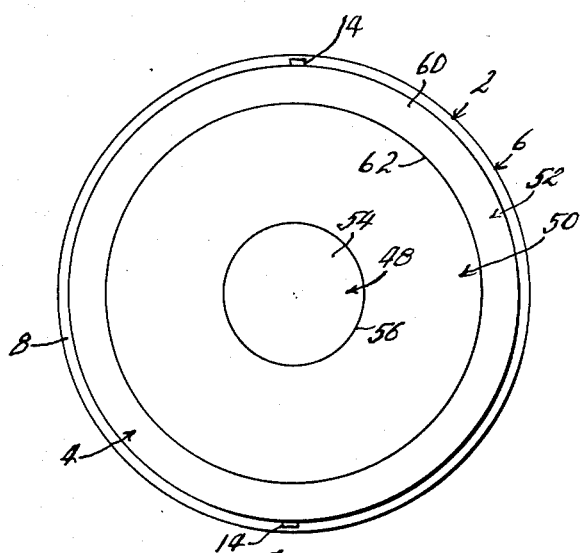
Figure 3:
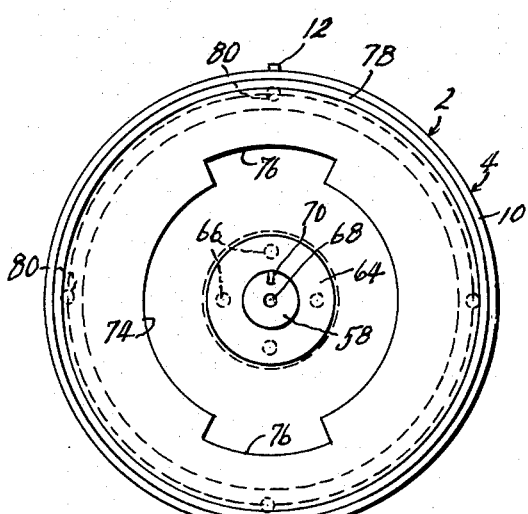
Figure 4:
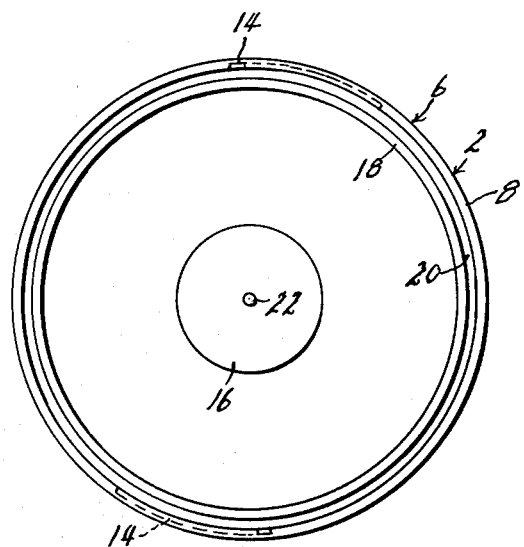
Figure 5:
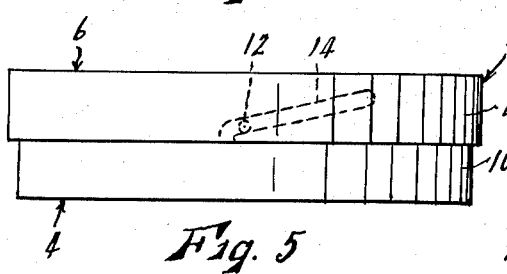
Figure 6:
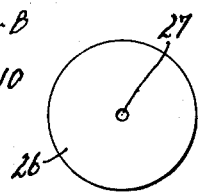
Figure 7:
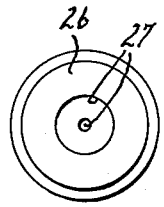
Figure 8:
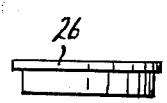

With these objects in view, as well as other objects which will appear in the course of the specification, reference will be had to the accompanying drawing, wherein:

FIG. 1 is a top plan view of a phonograph record holder embodying the present invention, FIG. 2 is an inverted plan view thereof, FIG. 3 is a top plan view of the lower section of the holder case, FIG. 4 is an inverted plan view of the upper section of the holder case, FIG. 5 is a side elevational view of the holder, FIG. 6 is a top plan view of a spacer utilized in the holder, FIG. 7 is an inverted plan view of the spacer, FIG. 8 is a side elevational view of the spacer, FIG. 9 is an enlarged, fragmentary sectional view taken on line IX—IX of FIG. 1, with parts left in elevation, and FIG. 10 is an enlarged, more fully sectionalized view of that portion of FIG. 9 included between lines A and B thereof.

Like reference numerals apply to similar parts throughout the several views, and the numeral 2 applies generally to a case forming the basic element of the present record holder. Said case is of flat, circular form, and of a diameter to enclose therein the largest phonograph record which it may be desired to store therein, in this case a nominally 12 inch (actually slightly less) 33⅓ rpm long-playing records. Said case is divided at right angles to the case axis into a lower section 4 and an upper section 6. The designation of these sections as "upper" and "lower" is for convenience only, since as will appear either section actually may be uppermost.

Upper section 6 is provided with a depending peripheral skirt 8 which engages downwardly and telescopingly over the circular peripheral wall 10 of lower section 4, to close the case. Wall 10 is provided at diametrically opposite points thereof with outwardly projecting pins 12 fixed therein, and said pins engage in grooves 14 formed therefor in the inner surface of skirt 8. Said grooves open through the lower edge of said skirt, whereby the case sections may be attached to and detached from each other, and are inclined helically to the axis of the case, whereby as the case sections are turned axially relative to each other in one direction, the case sections are forcibly drawn axially into more complete telescoping engagement. The axial engagement of the case sections is variable, as seen by the locking arrangement in FIG. 5, depending on the number of record discs within the case sections.

Upper case section 6 is provided with an integral circular post 16 depending axially from the top wall thereof, the diameter of said post corresponding to the central label area of a 12-inch record, and the planar bottom end surface thereof being normal to the case axis. Concentrically with said post, but spaced inwardly from skirt 8, top case section 6 is provided with an integral depending annular rib 18, the lower surface of which is coplanar with the lower end surface of post 16, and which is of a diameter to engage only the ungrooved marginal edge portion of a 12-inch record centered on post 16. The annular space between rib 18 and skirt 8 is designated at 20. Fixed coaxial in post 16 and depending therefrom is a hollow tubular spindle 22 of a diameter to enter the center hole of a 12-inch record. A plurality of 12-inch records 24 are so mounted on said spindle, in number up to the maximum recommended load for an automatic record changer spindle of a phonograph, usually five or six. With the top record of this stack pressed against post 16 and rib 18, spindle 22 extends well below the bottom record of the stack, to enter a spacer member 26.

Spacer member 26 is an element separate from the case itself, and comprises a thick circular disc adapted to be disposed coaxially in the case. It has a central bore 27 the upper portion of which is of a size to slip over spindle 22, and has a series of downwardly facing, axially spaced apart peripheral notches 28 formed in the wall thereof, as shown in FIG. 10. Spindle 22 opens upwardly into a cavity 30 of post 16. A locking arm 32 pivoted at its upper end on a transverse axis in said cavity, as at 34, projects downwardly through said spindle, and is provided at its lower end with a transversely extending tooth 36 adapted by pivoting of said arm to be extended through a slot 38 of the spindle to engage in one of notches 28 of the spacer, which notch depending on the number of records 24 being carried, whereby to lock the spacer to the top case section to secure the records in place, or to be retracted inwardly into slot 38 to release the spacer. Within cavity 30, arm 32 is provided with a transverse extension 40 which serves as a counterweight for pivoting arm 32 to engage tooth 36 whenever top case section 6 is so positioned that spindle 22 projects downwardly, as shown, and for releasing said tooth whenever the top case section is inverted from that position. In other words, arm 32 and tooth 36 constitute a gravity actuated lock designated generally by the numeral 33, and operable either to secure spacer 26 to spindle 22, or to release it therefrom, depending on whether top case section 6 is disposed in the position illustrated, or inverted relative thereto. Once the locking arm has been installed, cavity 30 may be permanently sealed by a cap 42. The upper end surface of spacer 26 is planar and normal to the case axis, and of the same diameter as the lower end of post 16, whereby to bear against the central label area of the lowermost of records 24. The lower end surface of spacer 26 is also planar and normal to the case axia, and of a diameter to engage only the central label area of records 44 of another type, in this case records of nominally 7 inch diameter (actually slightly less) which normally are played at 45 rpm. The central spindle hole of this type of record is much larger than the central spindle hole of the 12-inch records, usually of 1½ inch diameter. The lower end portion of the central bore of spacer 26 is enlarged to this diameter, and is provided about its periphery with a series of axially spaced apart notches 46, in this case facing upwardly, or oppositely to notches 28. Records 44 are supported primarily in lower case section 4.

Lower case section 4 consists basically, so for as its basic structure is concerned, of a central section 48, an annular intermediate section 50 surrounding said central section, and an annular outer section 52 surrounding said intermediate section, as is best understood by a consideration of FIGS. 2 and 9. Central section 48 includes a circular bottom plate 54 secured permanently at its periphery in intermediate section 50, as at 56, and an integral post 58 rising from said base coaxially with the case, and of a diameter to enter the central spindle holes of records 44. Intermediate section 50 is provided with a central axial aperture equal in diameter to the lower end portion of spacer 26, but of course larger than the diameter of post 58, so as to leave an annular space therebetween closed at its lower end by plate 58. Outer section 52 includes an annular bottom wall 60 permanently secured at its inner edge to the outer edge of intermediate section 50, as at 62, and a cylindrical wall, forming the outer wall 10 of the lower case section, rising from the outer edge of said bottom wall. Wall 10 is of greater diameter than the outer edge of intermediate section 50, whereby to form an annular space therebetween, closed at its lower end by wall 60.

Disposed in the described annular space between post 58 and intermediate section 50, for vertical sliding movement therein, is an annular presser member 64. The upper end surface of said presser is planar and normal to the case axis, and of a diameter equal to that of the lower end of spacer 26, so as to engage only the central label area of the lowermost of records 44. Said presser is biased upwardly by compression springs 66 interposed between the lower end thereof and bottom plate 54. The top end of post 58 is provided with an axial socket 68 for receiving spindle 22 whenever necessary, and is also provided in one side thereof with a slot 70 in which is pivotally mounted a gravity-operated lock 72 identical in all respects to lock 33 except for being inverted as compared to the latter. Lock 72 functions to release its tooth from the notches 46 of spacer 26 whenever, as shown, lower case section 4 is positioned so that post 58, projects upwardly, and to engage said tooth in one of said notches whenever said lower case section is inverted.

A socket 74 is formed in the top surface of intermediate portion 50 of lower case section 4, concentrically with post 58, and of a diameter to receive records 44 therein as shown. Said socket is of sufficient depth to receive and enclose up to the maximum recommended number of said records (up to 5 or 6) even when presser member 64 is fully elevated by springs 66. Socket 74 is enlarged at diametrically opposite sides by notches 76, to permit easy manual grasping of the edges of all of records 44 which may be contained in socket 74.

Disposed in the annular space between intermediate and outer sections 50 and 52, for vertical sliding movement therein is a second annular presser member 78, biased upwardly by compression springs 80 interposed between said presser and botton plate 60. The upper end surface of said presser is planar and normal to the case axis, and registers with the lower end surface of rib 18 of upper case section 6, so as to engage the ungrooved edge portion of the lowermost of large records 24.

In operation, to load the holder with records, the case sections 4 and 6 are first separated and laid on a flat surface, with spindle 22 of the upper section 6 and post 58 of the lower section projecting upwardly, and spacer 26 is separated from said posts. At this time, said spacer will be unlocked from said spindle and said post by the operation of gravity-actuated locks 33 and 72. 12-inch records 24 may then be assembled on spindle 22 of top case section 6, and 7-inch records in socket 74 of lower case section 4, according to any desired and pre-determined programming, and up to the number recommended as the maximum to be placed on the spindle of an automatic record changer at any one time. The records are preferably carefully cleaned to remove all dirt and dust as they are assembled in the case sections, and handled very carefully to avoid scratching or touching of their grooved surfaces. Thereafter, there will be no need to handle them as intimately. The 12-inch records are centered by spindle 22, resting on post 16 and rib 18, while the 7-inch records are centered by socket 74, rather than post 58, resting on presser 64, since presser 64 will at this time be elevated by springs 66.

Spacer 26 is then applied to the records 24 or 44 resting in which ever of case sections 4 or 6 it may be desired to lift and invert for connection to the other case section. If placed on 12-inch records 24, it engages over spindle 22. Then, holding case section 6 by the top wall thereof and the spacer, the case section is lifted and inverted, whereupon lock 33 engages a notch 28 of the spacer to lock the spacer to the spindle, whereby to lock records 24 in position. Case section 6 may then be handled freely in its inverted position, with no danger that records 24 will fall therefrom, as it is applied and secured to lower case section 4 by the engagement of pins 12 in grooves 14. As the upper section is applied to the lower section, spacer 26 engages the topmost of records 44, pressing records 44 and presser 64 downwardly against springs 66 until the center holes of records 44 are engaged over post 58. At the same time, the ungrooved edge portions of records 24, are pressed downwardly by rib 18 of the upper case section against presser 78, lowering said presser against springs 80. If spacer 26 is originally positioned on records 44, it is first pressed downwardly, lowering presser 64 against springs 66 until said records engage post 58, so that when lower case section 4 is lifted and inverted gravity lock 72 will engage one of notches 46 of the spacer to lock said spacer to post 58. Otherwise, the process of loading and closing the case is the same as already described.

The case may be opened to remove records for use, regardless of which of case sections 4 or 6 may be uppermost. The gravity lock 33 or 72 of the uppermost case section will always be engaged, so that it may be lifted free of the other section with no danger of spillage of records, so that it may be inverted to dispose the records carried thereby uppermost. The gravity lock 33 or 72 thereof will then disengage, permitting spacer 26 to be lifted free. The records of either section may then be lifted free of the case by grasping only the extreme edges of all of the records of either stack of records with the finger tips, at diametrically opposite sides thereof, so that the entire stack may be transferred to a phonograph spindle without touching the groove surfaces thereof, and similarly returned to the case after playing them. The annular space 20 between rib 18 and skirt 10 of section 6 provides finger clearance for grasping the edges of the 12-inch records, as do notches 76 of socket 74 for grasping the edges of the 7-inch records.

The record holder as shown possesses substantial advantages. As already described, it eliminates much of the need for individual handling of the records, such handling almost inevitably resulting in more or less physical damage to the records. When closed, it is substantially dustproof, thereby virtually eliminating the collection of dust and dirt on the records, and eliminating any necessity of cleaning the records each time they are played. When closed, it maintains each stack of records under axial resilient pressure, which flattens the records to correct slight warpages thereof, and to inhibit subsequent warpage thereof during long periods of storage. It also tends to prevent relative rotation, or slippage, between adjacent records of each stack, as could occur if the case should be subjected to rough handling.

With special regard to the axial pressurizing of the record stacks, such pressure is applied only to non-grooved areas thereof, to avoid damaging contact between the grooved areas. In this connection, it should be borne in mind that 12-inch records normally have central label areas somewhat thicker than the grooved areas thereof, so that they may be stacked without direct engagement of the grooved areas, and are also provided with thickened rims of the same thickness as the label areas, to further facilitate stacking. Nevertheless, the spacing between adjacent grooved areas of stacked records is so slight that substantial pressure on the stack could force them into damaging contact. Hence, in the present device, stack pressure is applied to the 12-inch records only in the central label area thereof, by post 16 and spacer 26, and at the ungrooved rims thereof, by rib 18 and presser 78, thus avoiding direct pressure on the intervening grooved area. In a 12-inch record, it is important to the warpage inhibiting function of the pressure that said pressure be applied both at the centers and rims of the records, due to the large size of such records. On the other hand, 7-inch 45 rpm records 44, while provided with thickened central label portions so that they may be stacked withouth substantial contact between their grooved surfaces, are not normally provided with thickened rims, so that when stacked, their edges are spaced slightly apart axially of the stack. Hence, stack pressure should not be, and in the present holder is not, applied to the rims, since such pressure would promote rather than inhibit warpage of the records. Of course, the holder could be modified to carry records of sizes other than those shown, or to carry records of the same size in both of the case sections, since this requires only obvious modifications in the size, configuration and disposition of spacer 26 and pressers 64 and 78.

While I have shown and described a specific embodiment of my invention, it will be readily apparent that many minor changes of structure and operation could be made without departing from the spirit of the invention.

What I claim as new and desire to protect by Letters Patent is:

1. A phonograph record holder comprising:
   a. a circular case divided normally to its axis into two sections each of which has an open end normally confronting the other section, and being closed at its opposite end to form a base, each of said sections being adapted to carry one or more disc-type phonograph records therein normally to its axis,
   b. connecting means operable to secure the open ends of said case sections in interengaging relation to close said case, with the records contained in each section confined to their respective sections, said connecting means being adjustable to secure said sections together at varying degrees of axial interengagement, whereby to compensate for variable numbers of records carried in each of the case sections, and c. loading means carried within the case and operable, as said case sections are moved coaxially into interengagement to close said case, to exert an axial load on the record or stack of records carried in each case section, whereby to secure said records against movement relative to each other, or relative to said case.

2. A record holder as recited in claim 1 wherein said loading means is positioned to exert pressure on said records only against ungrooved areas thereof, whereby to avoid pressing grooved areas thereof into possibly damaging contact with other records, or with the interior of said case.

3. A phonograph record holder comprising:
a. a circular case divided normally to its axis into two sections each of which has an open end normally confronting the other section, and being closed at its opposite end to form a base, each of said sections being adapted to carry one or more disc-type phonograph records therein normally to its axis,
b. connecting means operable to secure the open ends of said case sections together to close said case, with the record or records carried by each case section confined to that section, and
c. retainer means operable to secure the record or records carried in each of said case sections against removal therefrom through the open end thereof whenever said open end is facing downwardly whereby regardless of which section may be uppermost at any given time, said uppermost section may be detached and removed from the other section without spillage of records from the former, said retainer means comprising a spacer member disposed between those records carried by one of said case sections and those carried by the other section, a first gravity-actuated lock carried by one of said case sections, and a second gravity-actuated lock carried by the other of said case sections, each of said locks being adapted to secure said spacer member to the associated case section to secure any records carried therebetween in said case section whenever said case section is in position to open downwardly, and to release said spacer whenever said case section is positioned to open upwardly.

4. A record holder as recited in claim 3 wherein each of said case sections includes a central axial post extendable through the center holes of the records carried thereby, said spacer member being disposed centrally of said records, and wherein each of said gravity-actuated locks includes a member anchored relative to the associated post and extending through said post parallel to the axis thereof to engage said spacer releasably.

5. A record holder as recited in claim 4 wherein each of said gravity-actuated locks is operable to secure said spacer to the associated case section at variable axial positions relative thereto, depending on the number of records carried by that section, and with the addition of:
a. an annular presser member surrounding the axial post of one of said case sections and axially movable along said post, and
b. spring means biasing said presser along said post toward the open end of said associated case section, whereby said presser is urged against the adjacent record of those carried by that case section, and acts through the records carried by that section, and the spacer, to urge the records carried by the other of said case sections against the base of said other case section, whereby said records are axially loaded to correct warpage thereof and to inhibit further warpage.

6. A record holder as recited in claim 5 wherein said presser, said spacer, and the base of said other case section, are configurated to engage only ungrooved areas of said records.

7. A record holder as recited in claim 6 with the addition of:
a. a second annular presser member carried by the case section carrying said first presser member, and
b. spring means biasing said second presser toward the open end of that case section to engage only the ungrooved edge portion of the adjacent record carried by the other of said case sections, the base of said other case section being configurated to engage the ungrooved edge portion of the record adjacent it only in direct, opposed relation to said second presser.

* * * * *